United States Patent [19] [11] 3,757,314
Homma et al. [45] Sept. 4, 1973

[54] MAGNETIC BUBBLE DECODER

[75] Inventors: Noriyuki Homma, Kokubunji; Shigaru Yoshizawa, Kodaira; Yoshihiko Noro, Yokohama, all of Japan

[73] Assignees: Hitachi, Ltd., Tokyo, Japan

[22] Filed: Feb. 24, 1972

[21] Appl. No.: 228,898

[30] Foreign Application Priority Data

Feb. 24, 1971 Japan .................................. 46/8647

[52] U.S. Cl. ........................ 340/174 TF, 340/174 M
[51] Int. Cl. ............................................ G11c 11/14
[58] Field of Search .............................. 340/174 TF

[56] References Cited

UNITED STATES PATENTS 3,701,125 12/1970 Genovese ...................... 340/174 TF

OTHER PUBLICATIONS

IBM Technical Disclosure Bulletin Vol. 13, No. 11 Apr. 1971 pg. 32–99–3300.

IBM Technical Disclosure Bulletin Vol. 15 No. 2 July 1972 pg. 703–704.

*Primary Examiner*—James W. Moffitt
*Attorney*—Paul M. Craig, Jr., Charles E. Wands et al.

[57] ABSTRACT

A magnetic bubble decoder employs forward magnetic bubble paths each forming a magnetic bubble shift loop, backward magnetic bubble paths, series switches disposed in the forward bubble paths, for straight advancing the magnetic bubbles and parallel switches, disposed in said forward bubble paths, for branching the magnetic bubbles from said forward paths to the backward paths. Control lines are provided for alternatively energizing the series and parallel switches to be operated in cooperation with each other with response to coded electrical signals applied to the control lines. A magnetic bubble output corresponding to the applied coded electrical signal is generated from the shift loop of a specific address.

14 Claims, 5 Drawing Figures

MAGNETIC BUBBLE DECODER

BACKGROUND OF THE INVENTION

1. Field of the Invention

This invention relates to decoders suited for memory devices using magnetic bubble elements, and more particularly to a decoder capable of generating a magnetic bubble output corresponding to a coded electrical signal indicating the address of information stored in the memory device.

2. Description of the Prior Art

Shift register type mass memory devices using magnetic bubble elements have recently been proposed. This type of memory device in general comprises a large number of memory loops; one of the memory loops is selected and information is written into or read out of the selected loop. To select the memory loop used in the prior art, a decoder using semiconductor elements such as transistors and diodes has been in use. In this decoder an electrical signal is used for its input and output.

In this type of mass memory device, if the memory loop section is located in the close vicinity of the magnetic substrate such as an orthoferrite single crystal substrate, and the decoder is installed on the IC substrate, the necessary number of connection wires between the two substrates must be the same as the number of memory loops. This will result in low reliability and high production cost. If the number of memory loops is reduced, the number of memory information bits must be increased at the sacrifice of reading and writing speeds.

SUMMARY OF THE INVENTION

An object of this invention is to provide a decoder capable of generating a magnetic bubble output corresponding to a coded input electrical signal.

Another object of this invention is to provide a decoder installable in the close vicinity of the magnetic substrate comprising memory loops.

Another object of this invention is to provide a decoder suited for shift register type memory devices using magnetic bubble elements.

Briefly, the decoder of this invention is characterized in that n pairs of series and parallel switches are disposed in the forward paths each forming a magnetic bubble shift loop, the series switches are operated for straight advancing the magnetic bubbles in the forward bubble paths, and the parallel switches are for branching the magnetic bubbles from the forward paths to the backward paths, and n pairs of series and parallel switches cooperate with each other to be alternatively turned on and off in response to the coded electrical signals applied to n numbers of control lines, whereby a magnetic bubble output corresponding to input electrical signals is generated.

DESCRIPTION OF THE PREFERRED EMBODIMENTS

The features and advantages of this invention will be better understood from the following description when read in conjunction with the accompanying drawings.

It is to be noted that in this specification a bubble transmission system comprising T-bar type and I-bar type permalloy foils and a rotating field applying means is used for the sake of explanation. Other bubble transmission systems such as those comprising conductive loops and a driving current supplying means, or modified systems may be used for the purpose of this invention.

Figure 1:
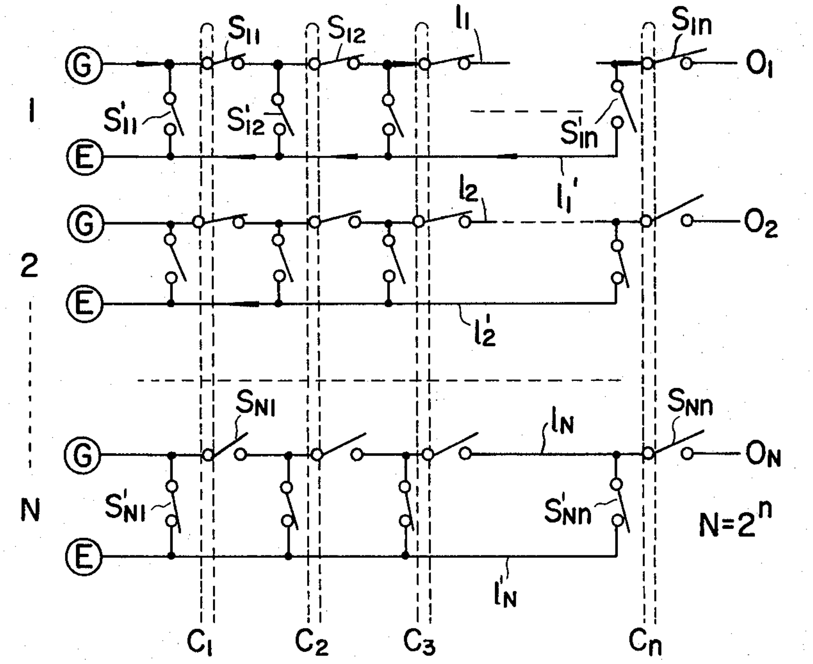
FIG. 1 is a schematic diagram showing a fundamental arrangement of the decoder of this invention.

Referring to FIG. 1, G denotes $2^n$ numbers of magnetic bubble sources connected to bubble forward paths $l_1$ through $l_N$ ($N = 2^n$) respectively. E denotes an erase circuit, to which the magnetic bubbles from the forward paths return by way of bubble backward paths $l'_1$ through $l'_N$. $S_{11}$ through $S_{Nn}$ represent series and parallel magnetic bubble cooperating switches arranged in n pairs ($S_{11}$, $S'_{11}$) through ($S_{Nn}$, $S'_{Nn}$) corresponding to an N number of shift registers. The series switches $S_{11}$ through $S_{Nn}$ and parallel switches, $S'_{11}$ through $S'_{Nn}$ are alternatively operated in cooperation with each other by pairs, in response to coded input electrical signals applied to an n number of control lines. For example, the series switch $S_{11}$ turns on while the parallel switch $S'_{11}$ is off, or vice versa. All the above means are disposed in the close vicinity of the magnetic substrate such as an orthoferrite single crystal substrate. A rotating field is applied to the magnetic substrate from a means (not shown diagrammatically) such as, for example, an X-Y exciting coil to which an AC current (sine and cosine) is applied. According to the invention, a magnetic bubble is generated from the magnetic bubble source installed on the magnetic substrate when a rotating field is applied to the coil. This magnetic bubble is returned to the erase circuit by way of paths comprising a T-bar and an I-bar type of permalloy foils. This operation is similar to what is described in "Electronic Materials" September, 1970, pages 78 – 84, and also in "Applications of Magnetic Bubble Domain," a publication (December, 1970) from the Institut of Electrical Engineers of Japan and The Institut of Electronics and Communication Engineers of Japan.

The coded input electrical signal indicates the address of each memory loop of the magnetic bubble memory device. When this electrical signal is applied to said control line, the corresponding switches are energized, for example, the switch $S_{11}$ turns on and the parallel switch $S'_{11}$ turns off. In this state the magnetic bubble goes straight in the forward path. If the two switching positions are reversed, the bubble branches from the forward path to the backward path and returns to the erase circuit E. The shift loops are provided with N numbers of decoding output terminals $O_1$ through $O_N$ respectively. Each pair of the cooperating switches in an individual shift loop are turned on and off by a corresponding coded input electrical signal, and the shift loop of only the address indicated by the coded signal is selected, the magnetic bubble from the magnetic bubble source of the selected loop is driven straight in the forward path of the selected loop and supplied to one of the output terminals. In this manner, a magnetic bubble output, to which the memory loop of the address corresponds to the given coded input electrical signal, is obtained. In the same shift loop the bubble backward path and erase circuit may be used in common to the forward path. In other words, the number of backward paths and erase circuits is not necessarily equal to that of the forward paths.

Figure 2:
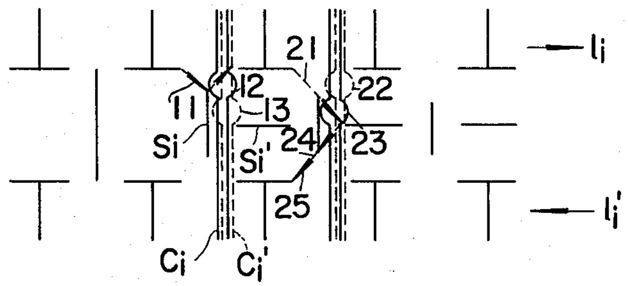
FIGS. 2 through 4 are schematic diagrams illustrating, by way of example, the magnetic bubble switching means used for the purpose of this invention.
Figure 3:
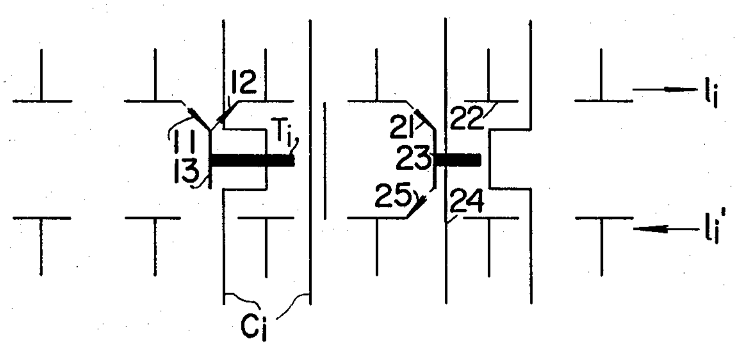
Figure 4:
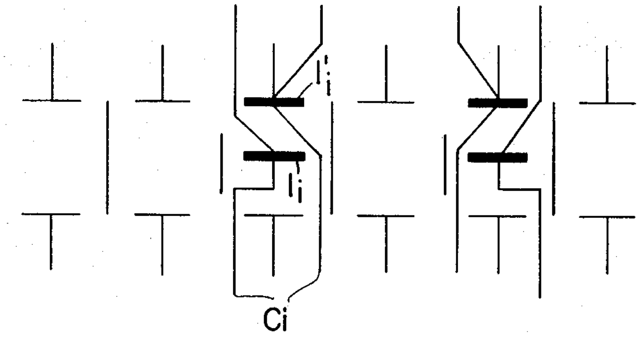

FIGS. 2 through 4 illustrate by way of example the magnetic bubble cooperating switching means. In FIG. 2, the bubble forward path $l_i$ and bubble backward path $l'_i$ comprise T-bar and I-bar type permalloy foils. The I-bar type permalloy foils $S_i$ and $S'_i$ are disposed between paths $l_i$ and $l'_i$, and a control line $C_i$ (the full line) having a circular loop is disposed in the position 12 or 13 between said foils $S_i$ and $S'_i$.

This device is operated in the following manner. When the counterclockwise rotating field is applied, the bubble is driven from left to right in the forward path $l_i$ and reaches the point 11. In this state the direction of the rotating field is assumed to be upward. When the rotating field is rotated by 90° and turned to the left, the bubble moves to either the position 12 or 13. To which position, 12 or 13, the bubble moves depends on the position of the circular loop and the polarity of the current (the coded input electrical signal) flowing in the circular loop. The bubble moves straight toward 12 when the circular loop is in the position 12 and the current flowing in the circular loop has the polarity at which the bubble is attracted. (This current will hereinafter be referred to as positive polarity current.) When the current has the polarity at which the bubble is repelled (this current will hereinafter be referred to as negative polarity current), the bubble moves to 13 and branches to the backward or return path $l'_i$. (Note: the bubble moving direction is reversed when the circular loop is in the position 13, at the same current polarity as above.)

These are the functions of the series and parallel cooperating switches. Namely, when the current flowing in the control line has a positive polarity, the series switch is on and the parallel switch is off. While, at the negative polarity, the above switching positions are reversed. According to this invention, the magnetic bubble can be more stably driven to go straight or branch therefrom by an arrangement wherein a control line $C'_i$, as indicated by the dotted line, is disposed in parallel with the control line $C_i$ and the circular loop of the control line $C'_i$ is positioned opposite to the circular loop of the control line $C_i$, so that the currents flowing in the individual circular loops $C_i$ and $C'_i$ stand at mutually complementary polarities (namely, one of the currents has a positive polarity while the other has a negative polarity). In other words, one of said circular loops serves as a series magnetic bubble switch, while the other serves as a parallel magnetic bubble switch. According to the invention, it may be so arranged that current is supplied only when the bubble passes through the loop, or current is supplied thereto in a DC sense. Also, it may be so arranged that permalloy foils comprising T-bar and I-bar type patterns is formed so as to lead the bubble from the forward path to the backward path via the branch path when no current is flowing in the control line, and thus the bubble is driven straight only when a field is produced in the circular loop by the current supplied to the control line.

FIG. 3 shows an example of magnetic bubble switching means wherein a T-bar $T_i$ comprising a hard magnet foil whose coercive force is larger than that of the rotating field is used instead of the foregoing circular loop, and the T-bar intersects the control line $C_i$. When the T-bar $T_i$ is magnetized by the current flowing in the control line $C_i$, the bubble is driven straight from 11 to 12 or branches toward 13, depending on the magnetized polarity. Whether or not the bubble is driven straight is determined by the crossing pattern of the control line and T-bar $T_i$ and by the direction of the current flowing in the control line. In the example of FIG. 2, current in the form of DC level or pulse must be continuously supplied to the control line during the decoding operation, whereas, in the example of FIG. 3, current is needed only when the T-bar is magnetized for each decoding.

FIG. 4 shows an arrangement wherein the control line $C_i$ is disposed so that hard magnet I-bars $I_i$ and $I'_i$ are magnetized in mutually opposite directions. Because the I-bars $I_i$ and $I'_i$ are complementarily magnetized, the switching operation is more stabilized.

Figure 5:
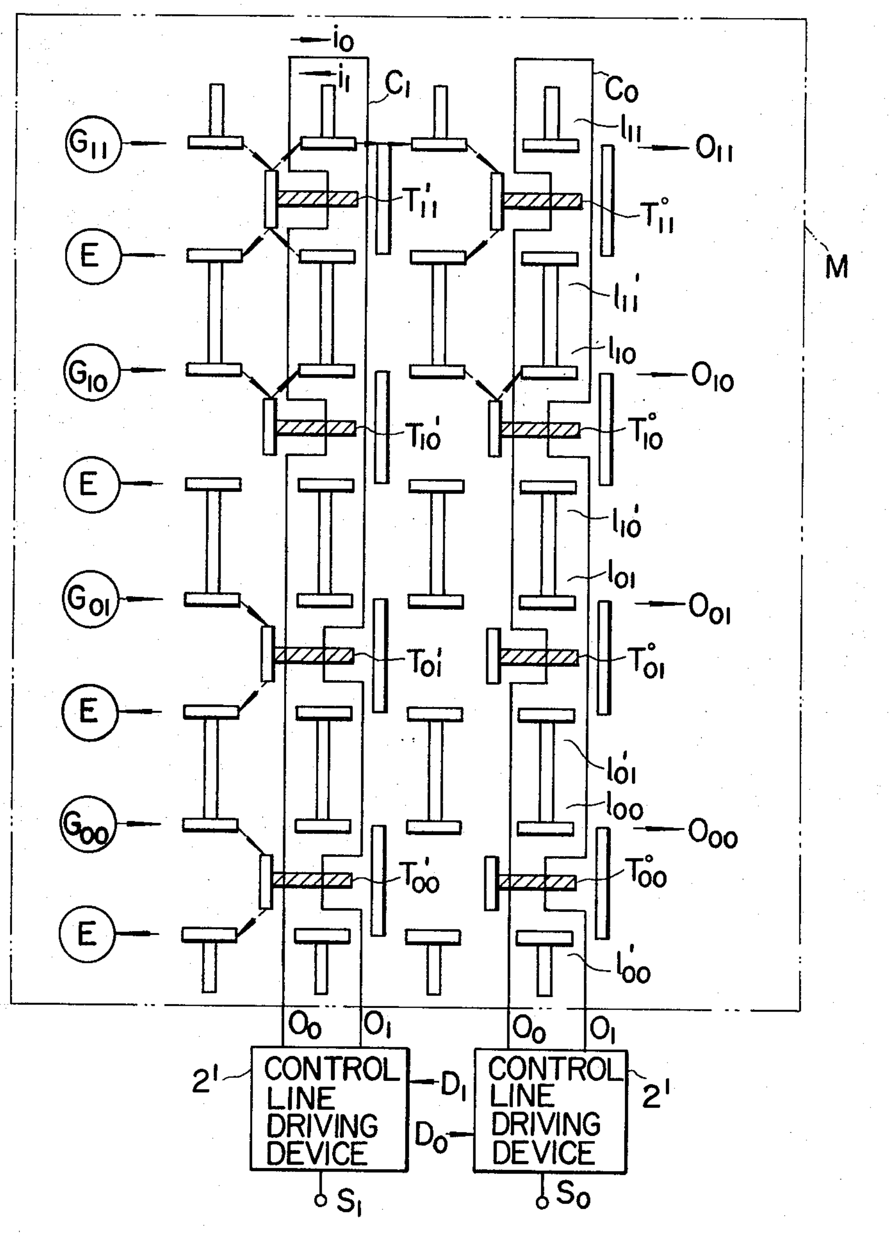
FIG. 5 is a schematic diagram showing an embodiment of this invention.

FIG. 5 schematically shows a 2-bit decoder using the cooperating switches shown in FIG. 3. In FIG. 5, $D_0$ and $D_1$ represent control line driving devices which supply the control lines $C_0$ and $C_1$ with current $i_1$ in the direction from the output terminal $0_1$ to $0_0$ when the coded input electrical signals $S_1$ and $S_0$ are "1", or with current $i_0$ in the reverse direction when the signals are "0". The wiring pattern of the control line $C_1$ with respect to the T-bar permalloy foil comprising a hard magnet bar (as indicated by the obliquely hatched lines) such as, for example, $T'_{11}$ is so arranged that the bubble is driven straight in the forward path $l_{11}$ by way of a series switch comprising the T-bar $T'_{11}$ when current $i_1$ flows in th control line $C_1$, or the bubble branches from the forward path $l_{11}$ to the backward path $l'_{11}$ by way of parallel switch when current $i_0$ flows therein. The switch constituted of a T-bar permalloy foil such as $T'_{00}$ comprising a hard magnet bar, whose control line wiring pattern is different from that of $T'_{11}$ is operated in a reverse manner to the above switch. In this case, therefore, the bubble branches to the backward path when $i_1$ flows therein, or advances straight in the forward path when $i_0$ flows therein.

When coded input electrical signals 1 and 0 are applied to the control line driving devices $D_1$ and $D_0$ respectively, the currents $i_1$ and $i_0$ flow in the control lines $C_1$ and $C_0$, respectively. At this moment, the hard magnet bars $T'_{11}$ and $T'_{10}$ crossing the control line $C_1$ are magnetized so that the bubble is driven straight, and the hard magnet bars $T'_{01}$ and $T'_{00}$ are magnetized so that the bubble branches to the backward path. $T^0_{10}$ and $T^0_{00}$ among the hard magnet bars crossing the control line $C_0$ are magnetized to make the bubble go straight, but $T^0_{11}$ and $T^0_{01}$ are magnetized to make the bubble branch to the backward path.

After all, among the bubbles generated from the bubble sources $G_{00}$ through $G_{11}$, only the one from $G_{10}$ goes straight and comes out at the output $0_{10}$. Similarly, when input signals 00, 01, and 11 are applied, bubbles come out only at the outputs $0_{00}0_{01}$ and $0_{11}$. Thus, by using n numbers of control lines and alternatively turning on-off $2^n$ pairs of cooperating switches, a bubble output corresponding to the given coded input electrical signal is obtained from only one of $2^n$ numbers of output terminals.

The decoder of this invention is highly practical when used for selecting the memory loop in the memory device using a magnetic bubble element, as well as for setting or selecting a logic circuit comprising magnetic bubble elements and for the similar purposes. According to this invention, the decoder uses magnetic bubble elements and can be installed in the close vicinity of the magnetic substrate having memory device or the like. Hence the number of wirings on the magnetic substrate can be markedly reduced in the decoder of this invention in comparison with the prior art.

What is claimed is:

1. A magnetic bubble decoder comprising:
a plurality of magnetic bubble sources;
forward bubble paths connected to the respective magnetic bubble sources;
at least one erase means;
at least one backward bubble path connected to said forward paths and to said erase means;
a plurality of magnetic bubble switches disposed to act in series with said forward paths and in parallel between said forward paths and respective backward paths;
a plurality of control lines for alternatively energizing said switches so as to effect cooperative on-off operation in response to a coded electrical signal applied thereto.

2. A magnetic bubble decoder comprising:
a plurality of first means for generating magnetic bubbles;
a plurality of first bubble paths coupled to the respective first means for conveying the magnetic bubbles generated by said first means in a first direction;
at least one second means for erasing a magnetic bubble applied thereto;
at least one second bubble path coupled between at least one respective first bubble path and a respective one of said at least one second means for conveying a magnetic bubble from a first bubble path in a second direction opposite said first direction toward said second means;
a plurality of magnetic bubble switch means including magnetic bubble parallel switch means, disposed between respective ones of said plurality of first bubble paths and respective ones of said plurality of second bubble paths, for coupling a first bubble path to a correspondingly associated second bubble path, and
magnetic bubble series switch means, disposed in each of said plurality of first bubble paths and individually located between a pair of said parallel switch means, for providing a series switchable conveying path from said first means for said magnetic bubbles generated thereby in said first direction;
a plurality of third means, coupled to said parallel and series switch means for controlling the opening and closing thereof, in response to electrical applied thereto, so as to control the passage of magnetic bubbles along said first and second bubble paths; and
a plurality of output terminals coupled to said plurality of first paths.

3. A magnetic bubble decoder according to claim 2, wherein said parallel and series switch means are associated in pairs and wherein each pair comprises a T-bar type permalloy foil switch, the state of which is determined by a signal supplied thereto from said third means.

4. A magnetic bubble decoder according to claim 2, wherein said parallel and series switch means are associated in pairs and wherein each pair comprises an I-bar type permalloy foil switch, the state of which is determined by a signal supplied thereto from said third means.

5. A magnetic bubble decoder according to claim 4, wherein said I-bar switch includes a pair of hard magnet I-bars magnetized in mutually opposite directions.

6. A magnetic bubble decoder according to claim 2, wherein said parallel and series switch means are associated in pairs and mutually connected to have one switch means open while the other associated switch means is closed.

7. A magnetic bubble decoder according to claim 6, wherein said plurality of first and second bubble paths each comprises N paths, where N is an integer, each of said first bubble paths has n series switch means connected therein, where *n* is an integer, and between each respectively associated first and second bubble paths there are *n* parallel switch means.

8. A magnetic bubble decoder according to claim 7, wherein each associated pair of switch means comprises a T-bar type permalloy foil switch.

9. A magnetic bubble decoder according to claim 7, wherein each associated pair of switch means comprise an I-bar type permalloy foil switch.

10. A magnetic bubble decoder comprising:
a plurality of first means for generating magnetic bubbles;
a plurality of first bubble paths, coupled at one end thereof to the respective first means and provided at the other end thereof with an output terminal, for conveying the magnetic bubbles generated by said first means toward said output terminal;
bubble erasing means including at least one second means for erasing a magnetic bubble applied thereto and at least one second bubble path, coupled to said second means, for conveying magnetic bubbles provided in said second bubble path toward said second means;
a plurality of sets of magnetic bubble switch means, each set including a plurality of switch means adapted to one of said first bubble paths, respectively, each of said switch means including a series magnetic bubble switch disposed in series in the respective first bubble path and a parallel magnetic bubble switch operatively connected between said respective first bubble path at an input side of a corresponding series magnetic bubble switch and a respective one of said second bubble path, said series and parallel bubble switches in each bubble switch means being alternatively opened or closed in relation to each other, so that each series bubble switch, when closed operatively conveys bubbles toward said output terminal, and that each parallel bubble switch, when closed, operatively bypasses the corresponding series bubble switch and conveys bubbles from the respective first bubble path to said bubble erasing means; and
a plurality of third means, coupled to said sets of switch means, for opening and closing the series and parallel buble switches, or vice versa, thereby controlling the passage of magnetic bubbles along said first and second bubble paths.

11. A magnetic bubble decoder according to claim 10, wherein said switch means comprises an I-bar type permalloy foil switch, the state of which is determined by a signal supplied thereto from said third means, said I-bar switch including a pair of hard magnetic I-bars magnetized in mutually opposite directions.

12. A magnetic bubble decoder according to claim 10, wherein said bubble erasing means includes a plurality of second bubble paths and a plurality of second means each connected to each said second bubble paths so that said plurality of first and second paths each comprises N pair paths, where N is an integer equal to or greater than 1, and *n* switch means in each set thereof are provided in each said N pair paths in such a manner that the parallel bubble switches are connected between respective ones of said first bubble paths and respective ones of said second bubble paths, where *n* is an integer equal to or greater than 1.

13. A magnetic bubble decoder according to claim 12, wherein each switch means comprises a T-bar type permalloy foil switch.

14. A magnetic bubble decoder according to claim 12, wherein each switch means comprises an I-bar type permalloy.

* * * * *